(12) United States Patent
Rowe (10) Patent No.: US 6,596,175 B2
(45) Date of Patent: Jul. 22, 2003

(54) METHOD FOR TREATING STATOR COOLING WATER TO PREVENT CLOGGING OF STRAINER IN THE COOLING SYSTEM OF AN INDUSTRIAL ELECTRICAL GENERATOR

(75) Inventor: Raymond Grant Rowe, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 109 days.

(21) Appl. No.: 09/795,580

(22) Filed: Feb. 28, 2001

(65) Prior Publication Data

US 2002/0117452 A1 Aug. 29, 2002

(51) Int. Cl.[7] .................................................. C02F 5/08
(52) U.S. Cl. .............................. 210/696; 134/3; 134/41; 210/741; 310/54; 422/3; 422/12; 422/14
(58) Field of Search ................................. 210/696–701, 210/741, 742; 310/52, 54; 422/3, 12, 14; 134/3, 41

(56) References Cited

U.S. PATENT DOCUMENTS

| | | | | |
|---|---|---|---|---|
| 3,634,705 A | * | 1/1972 | Fidei | 310/57 |
| 4,472,283 A | * | 9/1984 | Brooks | 210/698 |
| 4,547,294 A | * | 10/1985 | Goeldner | 210/697 |
| 6,326,709 B1 | * | 12/2001 | Adelmann et al. | 310/52 |
| 6,332,979 B1 | * | 12/2001 | Steffens et al. | 210/96.1 |

FOREIGN PATENT DOCUMENTS

WO    WO 99/43070    * 8/1999

* cited by examiner

Primary Examiner—Peter A. Hruskoci
(74) Attorney, Agent, or Firm—Nixon & Vanderhye, P.C.

(57) ABSTRACT

A method is disclosed to dissolve cupric oxide (CuO) deposits on a strainer in a stator water cooling system (SWCS) of an industrial electrical power generator. The method injects carbon dioxide ($CO_2$) into the coolant to increase the CuO solubility of the coolant. By increasing the solubility, the CuO level in the coolant is less than saturated. The unsaturated coolant dissolves the CuO deposits on the strainer.

10 Claims, 11 Drawing Sheets

SOLUBILITY OF CuO IN OXYGENATED SOLUTIONS
AS A FUNCTION OF $pH_T$ TO 300°C

FIG. 5

| Row # | Cu | CO2 | 42C pH | Supersat ppb |
|---|---|---|---|---|
| 1 | 0 | 0 | 6.74 | -12.33 |
| 2 | 0 | 25 | 6.48 | -41.43 |
| 3 | 13 | 0 | 7.16 | 11.23 |
| 4 | 13 | 25 | 6.86 | 5.82 |
| 5 | 6.5 | 12.5 | 6.81 | -2.59 |
| 6 | 0 | 12.5 | 6.59 | -25.16 |
| 7 | 13 | 12.5 | 7.01 | 9.40 |
| 8 | 6.5 | 0 | 6.97 | 2.05 |
| 9 | 6.5 | 25 | 6.66 | -13.83 |

Cu, $CO_2$ values in parts per billion (ppb)

CuO Supersat. (ppb) = $-3.479 - 17.56\,(Cu-6.5)/6.5 - 8.4(CO_2-12.5)/12.5 + 5.922(Cu-6.5)(CO_2-2.5)/812.5 + 3.952(Cu-6.5)^2/42.3 - 1.966(CO_2-12.5)^2/156.3$ $R^2\ adj = 0.9976$

FIG. 6

CorrosFactor = -3.922 -9.221(Cu-6.5)/6.5 + 1.1963($CO_2$ - 12.5)/12.5 -
1.461(Cu-6.5)/6.5($CO_2$-12.5)/12.5 + 1.172(Cu-6.5)/6.5(Cu-6.5)/6.5 +
0.4349($CO_2$-12.5)/12.5($CO_2$-12.5)/12.5

Corros Factor

| Cu | $CO_2$ | Y1 |
|---|---|---|
| 0 | 0 | 3.12 |
| 0 | 25 | 10.23 |
| 13 | 0 | -12.54 |
| 13 | 25 | -11.28 |
| 6.5 | 12.5 | -4.26 |
| 0 | 12.5 | 6.06 |
| 13 | 12.5 | -12.09 |
| 6.5 | 0 | -5.45 |
| 6.5 | 25 | -2.05 |

Cu, $CO_2$ values in ppb

METHOD FOR TREATING STATOR COOLING WATER TO PREVENT CLOGGING OF STRAINER IN THE COOLING SYSTEM OF AN INDUSTRIAL ELECTRICAL GENERATOR

FIELD OF THE INVENTION

The invention relates to the field of large industrial electrical power generators having liquid cooled stators. The invention particularly relates to liquid cooling systems for those stators.

BACKGROUND OF THE INVENTION

Industrial electrical power generators are large, heavy industrial machines having internal liquid cooling systems for their stators. These stators each have a liquid cooling system referred to as a stator water cooling system (SWCS). Stator cooling fluid, e.g., oxygenated water, circulates through the SWCS to cool the windings in the stator. The cooling fluid removes heat from the stator windings generated by the high energy electrical current flowing through the windings. The SWCS includes a network of cooling passages throughout the stator and that extend between the windings. These cooling passages should remain open and free of obstructions to ensure a high flow of coolant fluid to all sections of the stator. The SWCS also includes several components external of the stator including piping, such as coolant pumps, filters, a reservoir tank and a strainer.

To ensure a continuous flow of the coolant through the SWCS, the SWCS includes a strainer to remove debris and other particles which may have become suspended within the coolant fluid. If not removed from the coolant, debris and particles tend to become clogged in and obstruct the cooling passages of the SWCS. Removal of debris and particles from the cooling fluid is needed to avoid clogging the stator cooling passages. The strainer captures debris and particles as the coolant flows through the strainer. By removing debris and particles from the cooling water, the strainer serves to keep the cooling passages open to the flow of cooling fluid.

The strainer is usually positioned in a low temperature portion of the stator water cooling system, just upstream of the generator in the coolant piping. The strainer is generally a stainless steel mesh filter located in SWCS coolant piping external and upstream of the stator. The mesh of the strainer has a tendency to accumulate copper oxide from the water of the SWCS. The oxide builds up on the wires of the mesh and reduces the openings in the mesh through which the coolant is to flow. As the deposition of copper oxide of the strainer increases, the resistance of the strainer to the coolant flow similarly increases. A strainer with oxide deposits obstructs the flow of the cooling system, reduces the flow of cool fluid through the stator, and disrupts proper cooling of the stator. There is a long-felt need for techniques that reduce the corrosion of a SWCS strainer and thereby improves the flow of coolant through the SWCS.

Deposition of copper on the SWCS strainer is often due to deposits of metals dissolved in the coolant that form on the wire mesh of the strainer. The conductive widings of the stator are generally copper (Cu). Small amounts of the cooper (Cu) from the stator windings dissolve into the coolant as the coolant flows over the windings. The dissolved copper, especially copper ions ($C^{++}$), deposits on the mesh of the strainer as CuO. PCT Patent Application WO 99/43070 describes a technique for reducing cooper oxides from a stator cooling system (including the strainer) by replacing a mixed bed deionizer resin from the stator water cooling system with a larger capacity deionizer resin bed that contains only a cation resin. The cation resin chemically captures copper ions flowing in the coolant and, thus, reduces the copper ions in the coolant fluid.

SUMMARY OF INVENTION

Replacing the resin bed removes only copper ($Cu^{++}$) ions, but does not affect other ions, e.g., CuO, that form from in the coolant. CuO forms from the copper ions $Cu^{++}$ and dissolved $O_2$ in the coolant. The increase of dissolved CuO has been found to increase the deposits that form on the strainer in the SWCS. The CuO will deposit on the mesh of the strainer if the CuO is supersaturated in the coolant. Increasing the CuO solubility level of the coolant such that the CuO is no longer supersaturated should stop further CuO deposits and dissolve existing CuO deposits. The injection of $CO_2$ into the coolant modifies the pH of the water in the SWCS system. Increased $CO_2$ lowers the pH of the stator water cooling system water and, thereby, increases the solubility of CuO at the generator windings. The reduction of pH increases the dissolution of CuO from the stator windings. $CO_2$ can be injected by bubbling untreated air (which includes $CO_2$) through the coolant.

Deposits formed on SWCS strainers are due, at least in part, to deposition of cupric oxide (CuO) on the stainless steel strainer screen. Cupric oxide deposition becomes pronounced where the stator coolant is saturated with oxygen. An analysis of cupric oxide (CuO) deposits on the strainer indicated that that the mode of deposition is by crystal growth on the strainer mesh. This mode of deposition appears to be due to an excessive concentration (supersaturated) of dissolved CuO in the coolant at the strainer. The substantial deposition by crystal growth indicates that the concentration of dissolved CuO in the SWCS coolant exceeds the solubility limit of CuO, i.e., is supersaturated. Accordingly, the CuO deposits on the mesh of the strainer appeared to be due to supersaturation of CuO in the coolant.

The CuO deposits on the SWCS strainer mesh can be substantially reduced by eliminating supersaturated levels of CuO in the coolant. The coolant will dissolve the CuO deposits if the CuO solubility level of the coolant is undersaturated. A system and technique has been developed to eliminate supersaturated levels of CuO in the SWCS coolant. To eliminate the supersaturated levels of CuO, the CuO solubility level of the coolant is increased. By increasing the amount of CuO that can be dissolved in the coolant, the amount of CuO in the coolant can remain chemically dissolved, and solid CuO deposits in the SWCS can be dissolved into the coolant. Since the CuO is fully dissolved in the coolant, the supersaturated CuO condition at the strainer is eliminated and the propensity for CuO crystal deposits on the strainer is dramatically reduced.

The solubility of CuO in the coolant is dependent on the temperature and acidity/base (pH) of the coolant. The chemical properties of CuO in a solution are well known. The solubility of CuO (as $Cu^{++}$) in oxygen-saturated water is reported for different conditions of temperature and pH in D. D. MacDonald, G. R. Shierman and P. Butler, "Thermodynamics of Metal-Water Systems at Elevated Temperatures. Part 1. The Water and Copper-Water Systems", AECL4136, Whiteshell Nuclear Research Establishment, Manitoba, Canada, December 1972. However, this general knowledge of CuO in solution would not have suggested that plugging of strainers in SWCS systems was due to CuO, that CuO deposits were due to crystal growth resulting from supersaturated levels of CuO in the coolant," or that the CuO depositions could be dissolved by altering the chemical and/or thermal conditions of the coolant at the strainer.

The deposits of CuO in SWCS strainers can be dissolved by adjusting the stator coolant chemistry so that the solubility of the dissolved copper ions ($Cu^{++}$ and CuO is changed from a supersaturated condition to an undersaturated condition at the SWCS strainer. Increasing the solubility of CuO in the coolant causes all of the CuO in the coolant to be chemically stable and dissolves CuO deposits in the strainer (and elsewhere in the SWCS), and eliminates supersaturation of CuO in the coolant. By adjusting the pH and/or temperature of the SWCS coolant water, the chemistry of the coolant water becomes strongly undersaturated in copper ions ($Cu^{++}$) and CuO at the strainer.

The coolant chemistry can be adjusted, for example, by injecting $CO_2$ into the coolant. $CO_2$ can be injected by bubbling untreated air through the coolant. Increasing the $CO_2$ level causes the CuO solubility level of the coolant to similarly increase. If the CuO solubility level is sufficiently increased, any CuO in the coolant remains in solution and does not deposit on the strainer. Under conditions of undersaturation, crystal growth does not occur and CuO crystal deposits on the strainer are substantially dissolved into the coolant. Without CuO crystal deposits, much of the corrosion and clogging of the mesh of a SWCS strainer is prevented. This technique of increasing the solubility of the stator coolant can be used to provide emergency clearing of the strainer, if strainer plugging is imminent.

BRIEF DESCRIPTION OF THE DRAWINGS

The invention, its structure and function and method of making and using the invention will be better understood from the detailed description of the preferred embodiment of the invention with reference to the drawings, which are as follows:

FIGS. 2A and 3B are two high resolution photographs of microscopic crystal growth on the mesh of a SWCS strainer;

DETAILED DESCRIPTION OF THE PREFERRED EMBODIMENT(S) OF THE INVENTION

Figure 1:
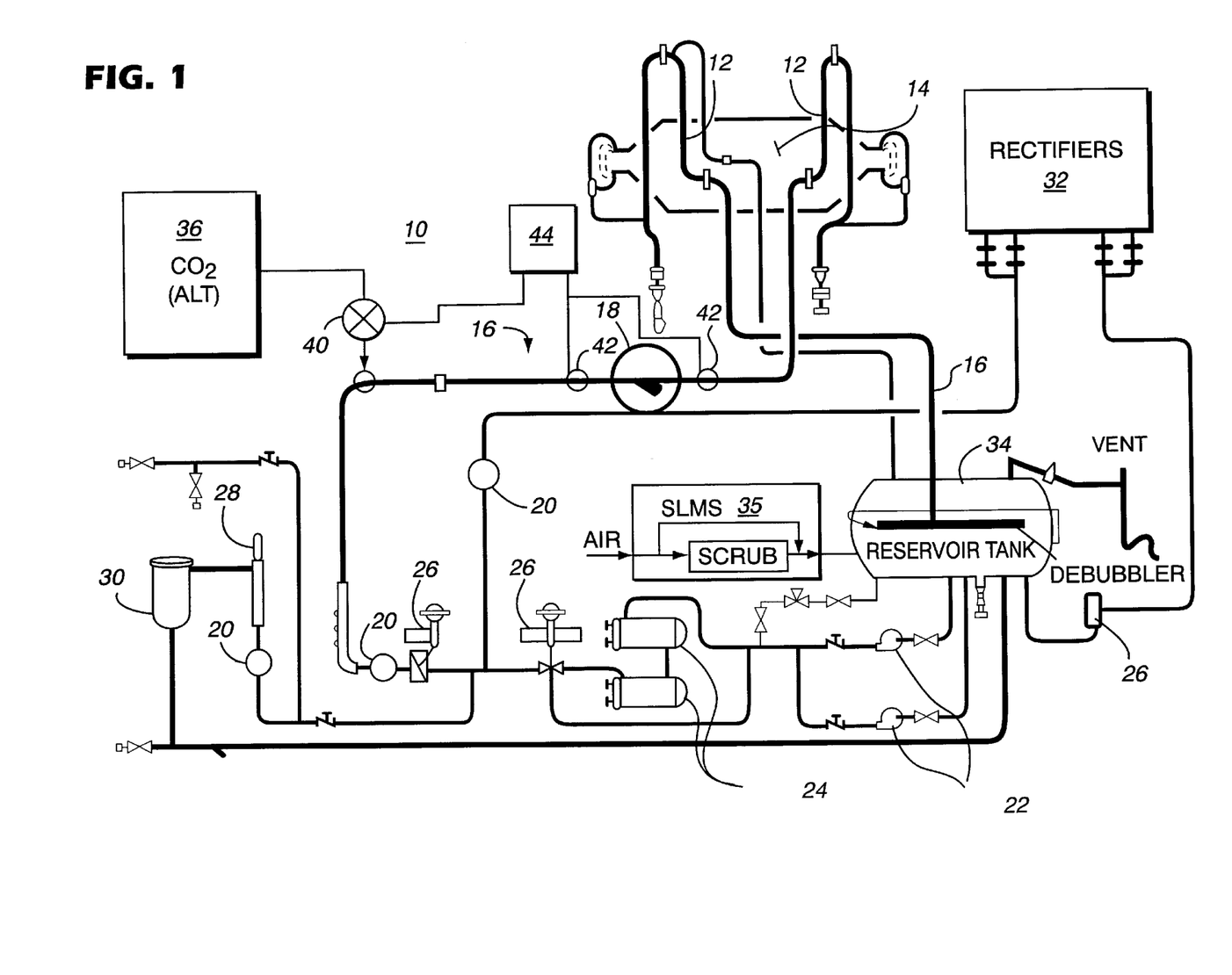
FIG. 1 is a schematic diagram of a stator water cooling system (SWCS) that illustrates the location of a strainer in the cooling piping.
Figure 2A:
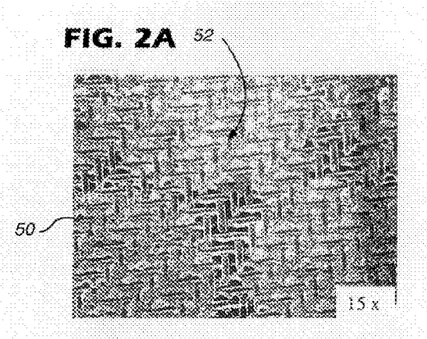
FIGS. 2A to 2D are a sequence of close-up photographs showing the mesh in increasing magnification of a SWCS strainer to show the crystal deposits on that mesh.
Figure 2B:
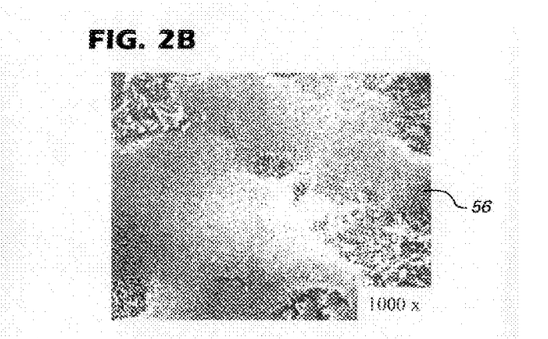
Figure 2C:
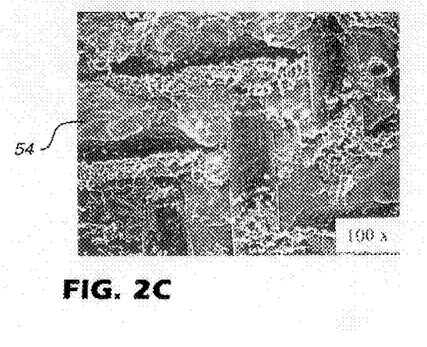
Figure 2D:
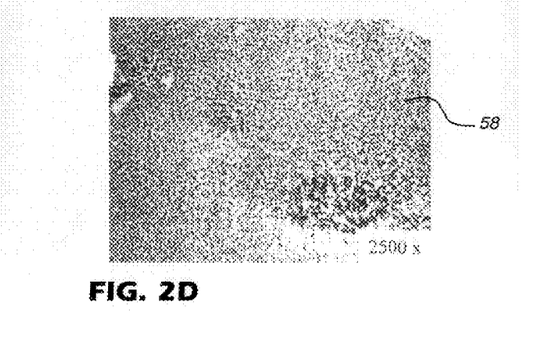

FIG. 1 shows schematically a stator winding cooling system (SWCS) 10 which circulates coolant, e.g., oxygenated water, through cooling passages 12 of the stator of a generator 14. The SWCS includes piping 16 external to the generator that carries the coolant through a network including a strainer 18, other filters 20, pumps 22, heat exchangers 24, flow controllers 26, coolant flow meters 28, a deionizer bed 30, rectifier 32, and coolant reservoir tank 34. The strainer 18 is typically in the piping 16 just upstream (referring to the flow of the coolant) of the generator 14 and in a cool (low) temperature portion of the SWCS.

Coolant continually circulates through the SWCS network. The coolant is drawn from the reservoir tank 34 by the stator water pumps 22, and flows into the heat exchanger which cools the fluid. The cooled fluid from the heat exchanger flows through filters 20 and the strainer 18 and into the stator cooling passages of the generator. As the coolant in the cooling passages flows over the cooper windings, the coolant removes heat from the stator and windings. The heat is carried by the coolant out of the generator into the reservoir 34.

Any electrical charge accumulated by the coolant as it flows through the highly electrically charged passages in the stator is discharged as the coolant is circulated through the rectifier 32. The coolant is deionized in a deionizing bed 30 to reduce the tendency of metal oxides to form in the coolant. The flow rate of the coolant is controlled by flow control valves 26, and monitored by flow meters 28 that provide a feedback control for a controller 44 that operates the control valves 26. These just-described components of the SWCS are conventional.

The SWCS system shown in FIG. 1 (in contrast to conventional systems) has the capacity to increase the saturation level for CuO in the stator coolant. This capacity enables the SWCS to prevent and/or reverse cupric oxide (CuO) deposit buildup at stator cooling water strainer and, thus, prevent clogging of the strainer. In addition, this capacity to eliminate deposits on the strainer reduces the frequency of having to shut down the generator to clean the strainer.

The SWCS is able to: (1) inject carbon dioxide ($CO_2$) into the stator water cooling system, (2) monitor coolant pressure drop across the strainer, and (3) start the injection of carbon dioxide if the pressure drop across the strainer exceeds a threshold pressure drop and stop the injection if the pressure drop falls below a predetermined level (the pressure drop will fall because the $CO_2$ injections has clean out the mesh of the strainer). Carbon dioxide ($CO_2$) is injected into the stator water cooling system to a target $CO_2$ content of, for example, between 3 and 20 parts per billion of the coolant, depending upon the copper ion ($Cu^{++}$) concentration in the SWCS coolant. The injection of carbon dioxide prevents the crystal growth of CuO in the strainer dissolves CuO crystals on the strainer, and limits corrosion of the stator SWCS.

$CO_2$ may be injected into the stator coolant by bubbling untreated air through the coolant in the reservoir tank 34. The $CO_2$ dissolved from the air into the coolant is sufficient to modify the Ph level of the coolant. Untreated air can be bubbled through the reservoir using a conventional stator leak monitoring system (SLMS) 35. Conventional SLMS include scrubbers to eliminate $CO_2$ from air bubbled through the coolant. Thus, a conventional SLMS has been modified such that untreated air is allowed to by-pass the scrubbers (or the scrubbers are temporarily disabled) so that the untreated air is injected by the SLMS 35 into the coolant in the reservoir tank 34.

Alternatively, the SWCS includes a source of $CO_2$ 36 and a controlled flow valve 40 for injecting $CO_2$ into the coolant flow. The flow valve 40 may be manually operated (such as by a generator technician who periodically injects carbon dioxide in the coolant to clear the strainer) or automatically by a computer controller associated with the SWCS of the generator (such as the controller for the generator having the stator cooled by the SWCS).

The computer controller 44 monitors the coolant pressure drop across the strainer to detect incipient strainer clogging. If the pressure drop across the strainer increases, then sufficient $CO_2$ is injected into coolant to dissolve the CuO deposits on the mesh of strainer. By dissolving the CuO depositions, the mesh openings are re-opened so that the coolant freely flows through the strainer. Pressure sensors 42 at the coolant inlet and outlet of the strainer monitor the pressure drop across the strainer. As the strainer pressure drop is reduced due to the dissolved CuO, the pressure sensors 42 detect that the pressure drop across the strainer is reduced and begins to return to normal pressure drop values. The pressure drop measurement may be manually monitored and a service technician of the generator may determine when to inject $CO_2$. Alternatively, a computer based controller 44 may automatically monitor the pressure drop across the strainer. If the controller detects a pressure drop across the strainer exceeds a predetermined threshold level, e.g., a pressure drop of 150% of a pressure drop with a new strainer, the controller may actuate the flow valve 40 to cause the injection of $CO_2$ into the coolant. Similarly, the controller may turn off the valve and stop the $CO_2$ injection when the pressure drop across the strainer has returned to a normal level, e.g., to less than 125% of the pressure drop across an new strainer. The crystalline deposit of CuO on the strainer is dissolved by the injection of $CO_2$. Moreover, the injection of $CO_2$ may be automated and under the control of a computer controller. Accordingly, the strainer in a SWCS may be cleared by automatic injection of $CO_2$.

FIGS. 2A to 2D present a sequence of photographs at increasing magnification showing a mesh of a strainer that has been in operation in a SWCS and has deposited crystalline CuO. Photograph 50, taken at lowest level of magnification, shows the weave of the strainer mesh 52 is readily visible. The photographs 50, 54, 56 and 58 were taken at increasingly higher levels of magnification to show the crystalline deposits on the mesh 52 that clog the strainer. These photographs demonstrate that the clogging of the mesh in a SWCS strainer is due to crystalline growth on the mesh. In photograph 54, taken at a magnification of 100 times normal view, the deposits on the mesh can be seen to almost entirely block the open gaps in the weave of the mesh 52 and, thereby, obstruct the flow of coolant through the mesh. The crystalline nature of the deposit on the mesh 52 is more apparent in photographs 56 and 58 taken at levels of magnification 1000× and 2500×, respectively.

Figure 3A:
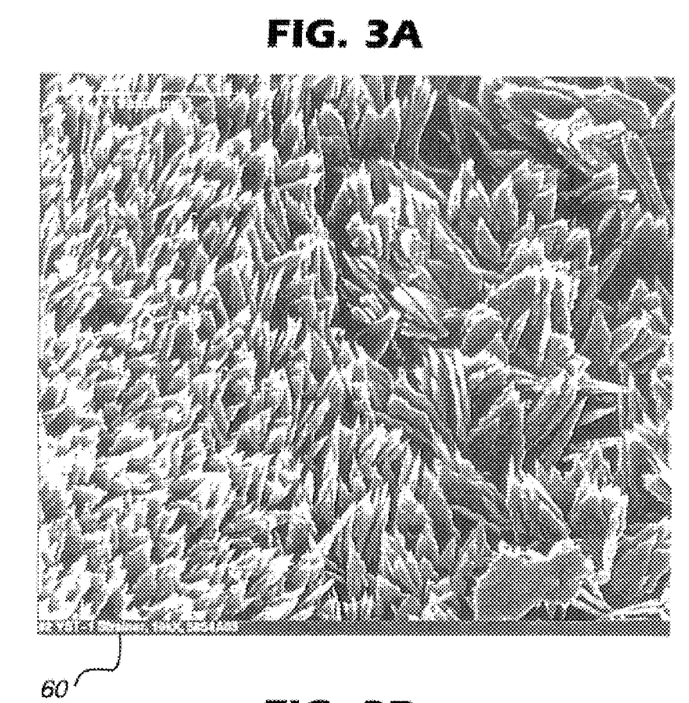
Figure 3B:
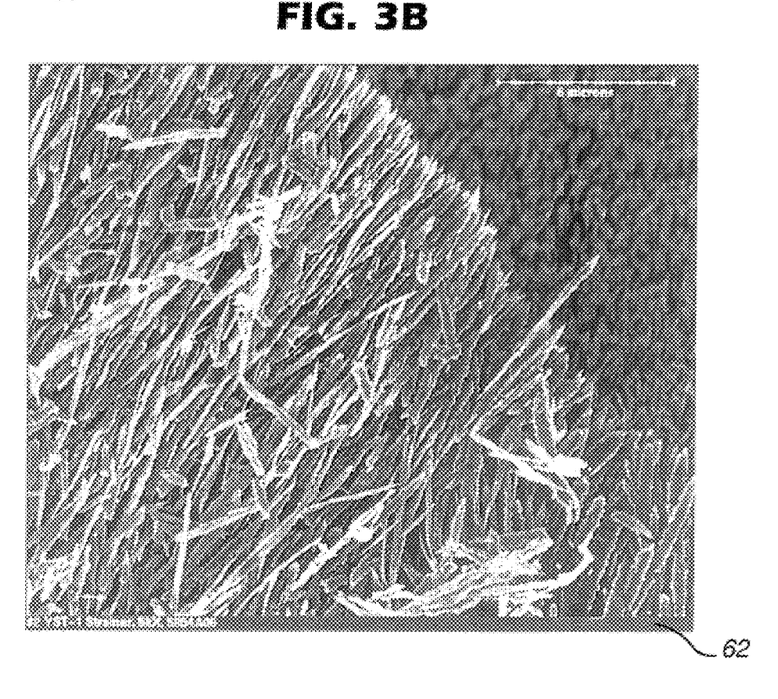

FIGS. 3A and 3B show a pair of extremely high-magnification photographs of the crystalline CuG deposits on the mesh of a strainer taken from a SWCS. Photograph 60 and 62 shows CuO crystals having a needle or knife-shape morphology. The crystalline growth shown in photographs 60 and 62 is due to the deposition of CuO on the mesh of a strainer, through which flowed coolant with supersaturated levels of CuG. Similar crystalline deposits were found in all plugged SWCS strainers that were examined by applicant. Identifying the crystalline deposits established that plugging occurred by CuO crystal growth and that a supersaturation of CuO existed at the strainer during operation.

Crystal growth at the strainer is reduced by preventing CuO crystal growth on the mesh of the strainer. This crystal growth occurs primarily under conditions of $Cu^{++}$ and CuO supersaturation. Supersaturation occurs when the CuO concentration in the SWCS water exceeds the solubility of CuO at the strainer. A typical SWCS operates a mixing valve temperature (generator inlet) of above 35° C. Using a temperature of 42° C. at the strainer, the solubility of CuO was determined from copper oxide solubility versus temperature data computed by MacDonald, et al in "Thermodynamics of Metal-Water Systems at Elevated Temperatures. Part 1. The Water and Copper-Water System". This chart 66 in FIG. 4 graphically shows the solubility of CuO in oxygenated water, such as is commonly used for a stator coolant in a SWCS system.

Figure 4:
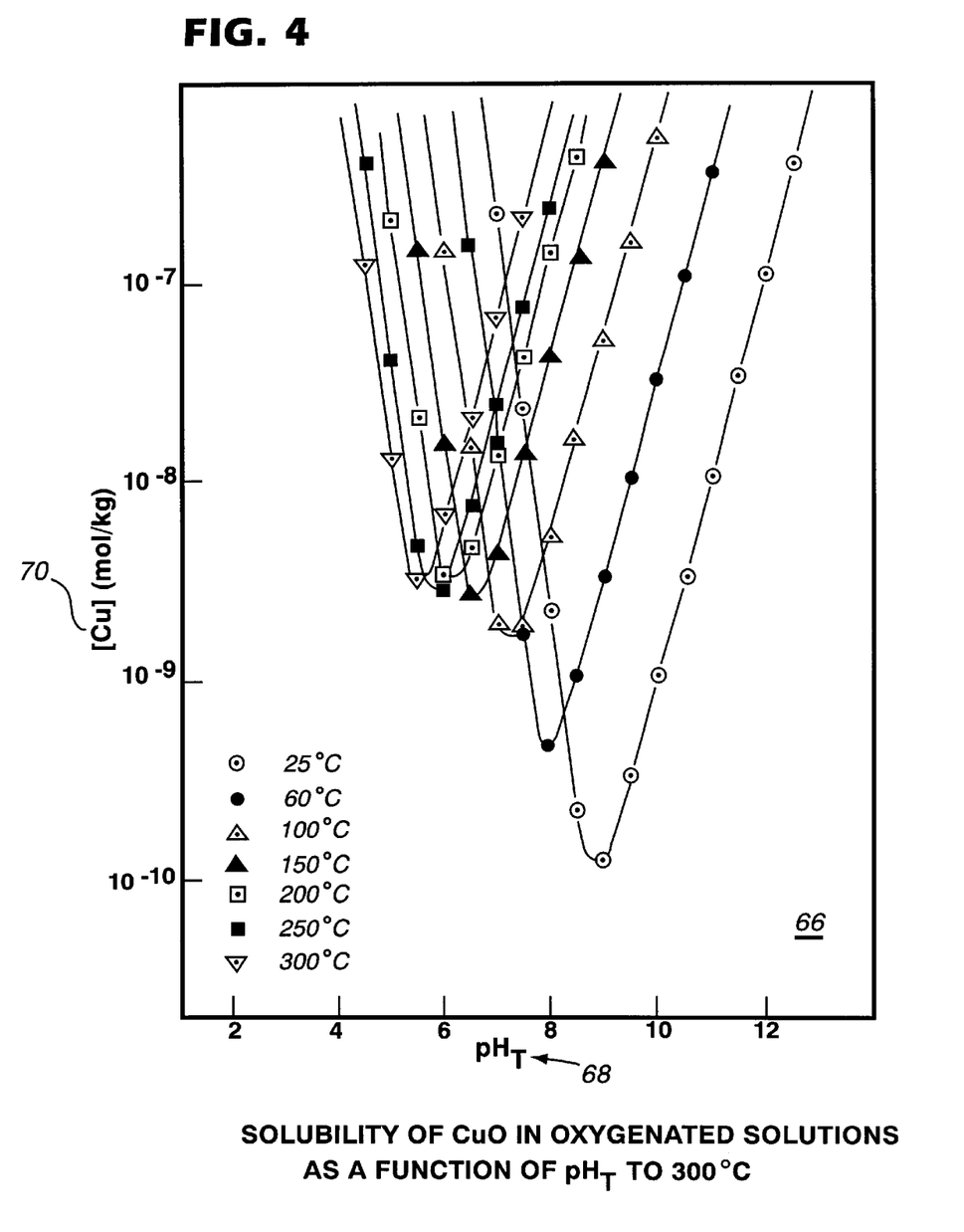
FIG. 4 is a chart illustrating the solubility of CuO with respect to the pH level of oxygenated solutions, e.g., water.

The pH (68) of water containing CuO which dissociated to form $Cu^{++}$ ions 70 and dissolved $CO_2$ (which dissociates to form $HCO3$ ions over the pH range of the SWCS) can be computed by conservation of $H^+$ and $OH^-$ ions during the dissociation reactions for these two molecules. $Cu^{++}$ formation increases pH. Conversely, $HCO_3$ formation decreases the pH of the coolant. The solubility versus pH at 42° C., as determined for each ($Cu^{++}$, $CO_2$) condition, was used to construct an analytical set of data of CuO supersaturation at the strainer.

Figure 5:
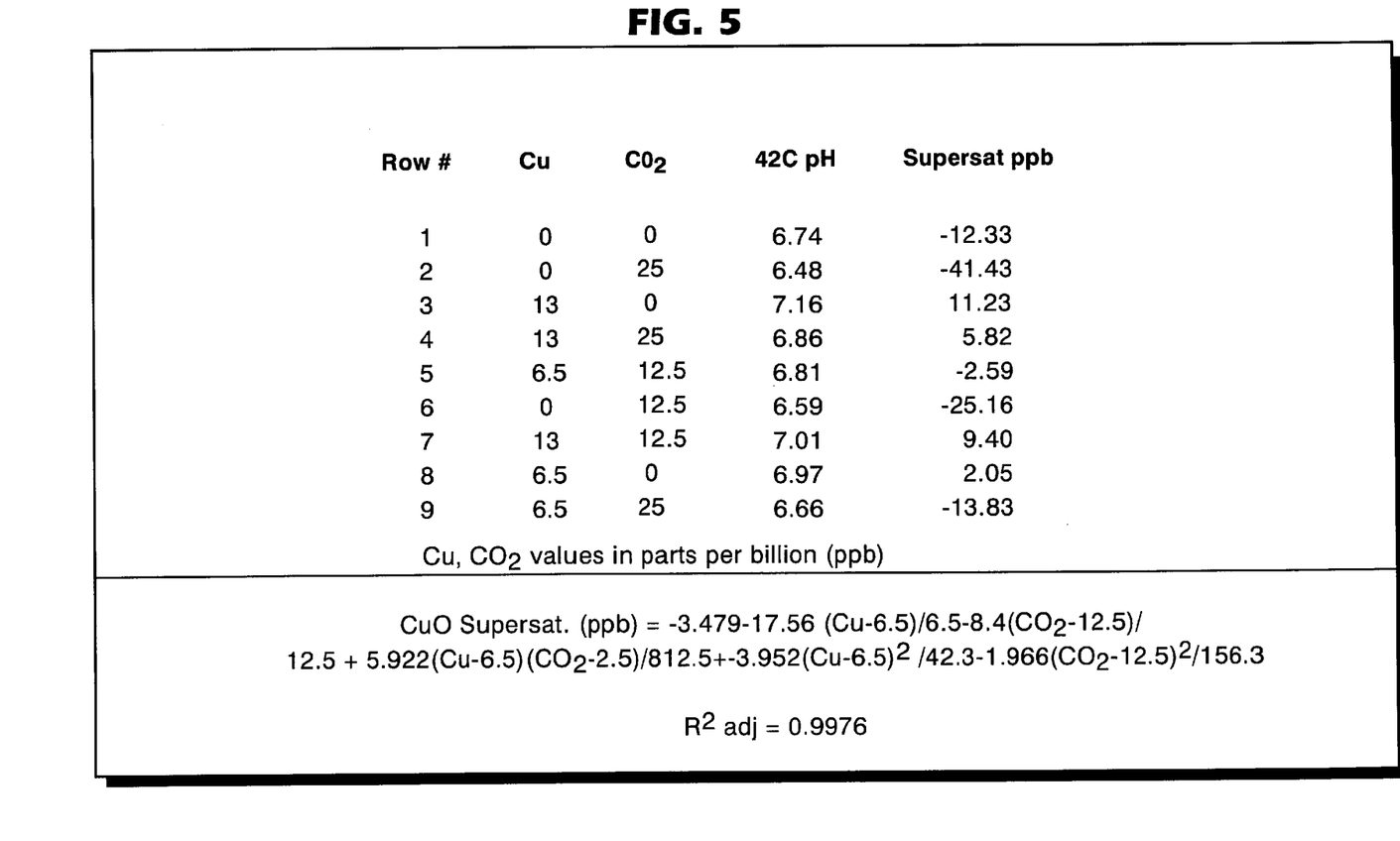
FIG. 5 is a chart showing an analytical multivariate regression analysis of supersaturation as a function of $Cu^{++}$ and $CO_2$.

FIG. 5 shows a multivariate quadratic regression analysis (CuO supersat.) of CuO supersaturation versus copper ion concentration ($Cu^{++}$) and total soluble $CO_2$ in the coolant. The analysis describes over 99% of the variation of supersaturation and provides a reliable representation of CuO supersaturation within the range of $Cu^{++}$ from 0 to 13 ppb (parts per billion) and $CO_2$ from 0 to 25 ppb. Using the regression equation, a contour plot of supersaturation vs $Cu^{++}$ and $CO_2$ was generated. This contour plot is shown in FIG. 6.

Figure 6:
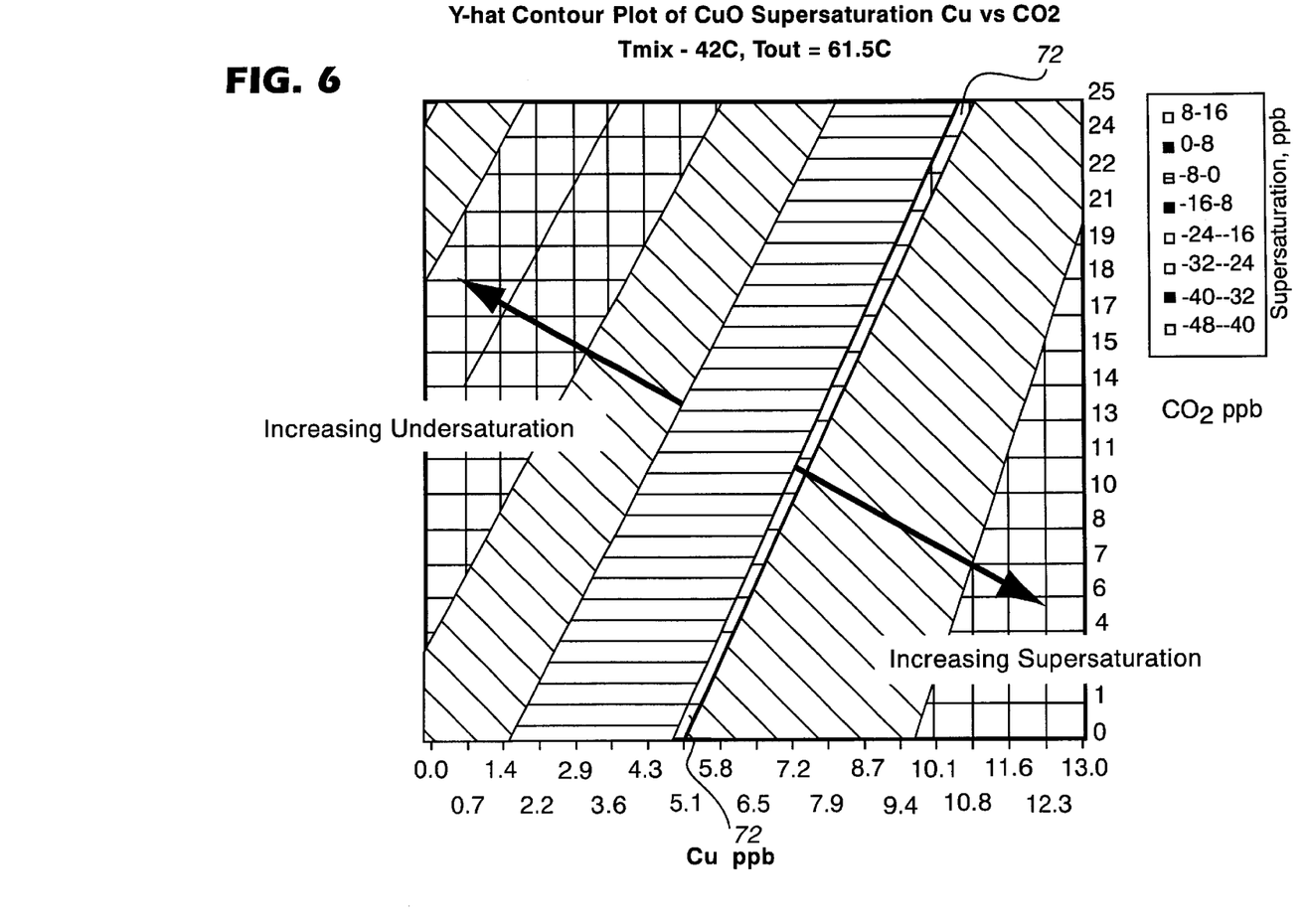
FIG. 6 is contour graph of CuO supersaturation (corrosion factor) as a function of $Cu^{++}$ and $CO_2$ in solution.

The white diagonal line 72 in FIG. 6 from (0 ppb $CO_2$, 5 ppb $Cu^{++}$) to (25 ppb $CO_2$, 11 ppb $Cu^{++}$) defines a locus of zero supersaturation. To the right of the white line, defines the conditions where $Cu^{++}$ supersaturation is positive at the strainer. These supersaturation conditions mean that additional crystal growth could occur on the strainer. To the left of the white line, $Cu^{++}$ supersaturation is negative and CuO crystals on the strainer should dissolve into the coolant. An increase in the soluble copper ion concentration increased supersaturation. Conversely, an increase in dissolved $CO_2$ or HCO concentration reduced supersaturation.

Corrosion of CuO at the high and low temperature conditions of the generator water-cooled winding strands is another critical variable to be considered in setting the optimum water chemistry to dissolve CuO deposits. FIG. 6 shows that increasing $CO_2$ reduces the (supersaturation) level of the coolant for a fixed copper ion concentration. As $CO_2$ is added, the existing dense CuO layer in the winding strands corrodes to raise the $Cu^{++}$ concentration to a new higher equilibrium value in the coolant. Corrosion will occur at a rate that is roughly proportional to the difference between the equilibrium copper concentration (CuO solubility) and the actual concentration. It is estimated the potential for corrosion (the "Corrosion Factor") is this difference between the equilibrium concentration (CuO solubility) and actual CuO concentration. If the copper concentration equals the equilibrium value, the difference is zero and there should be no corrosion of CuO. On the other hand, if the copper concentration was much lower than the equilibrium value then there should be a strong corrosion driving force.

Figure 7:
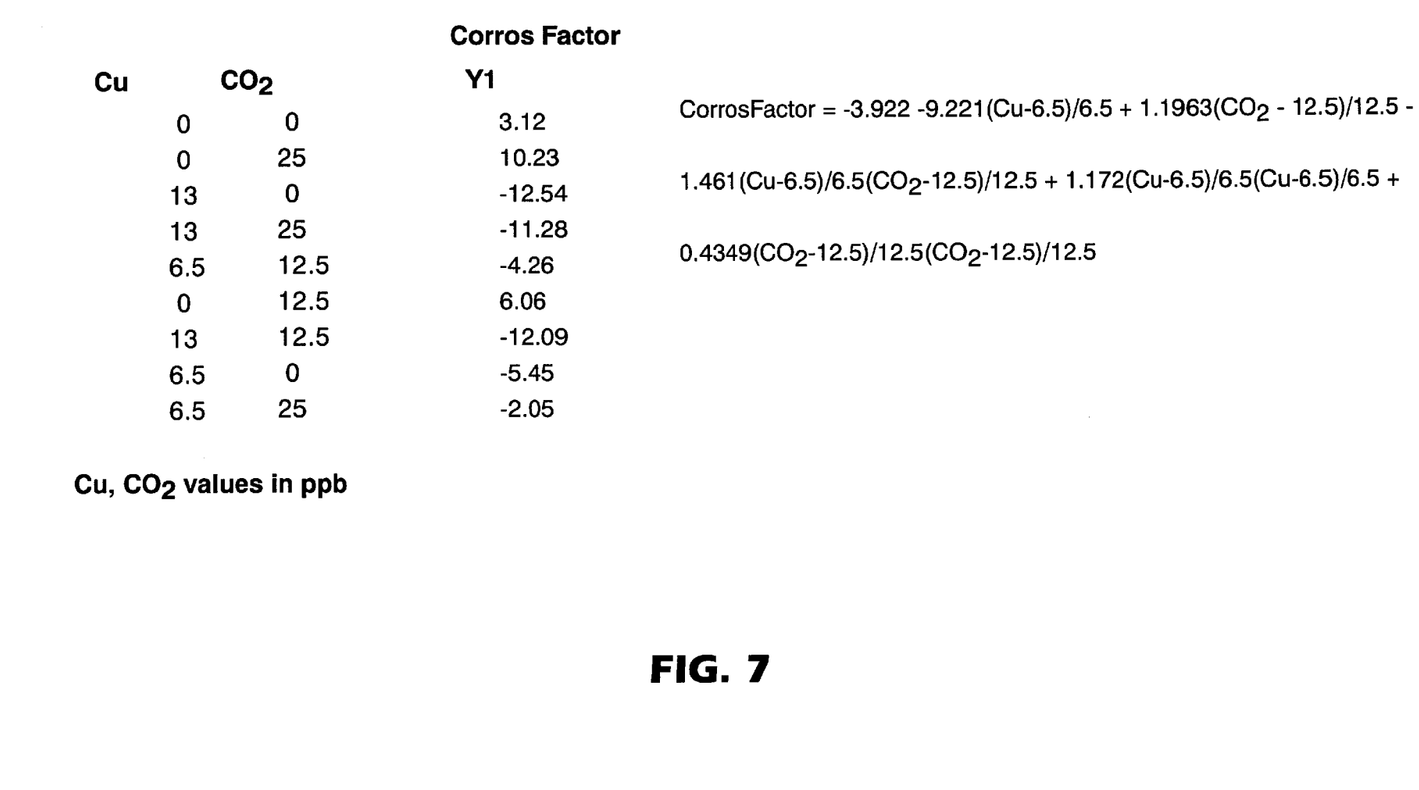
FIG. 7 is a charting showing a regression analysis of a corrosion factor as a function of $Cu^{++}$ and $CO_2$.
Figure 8:
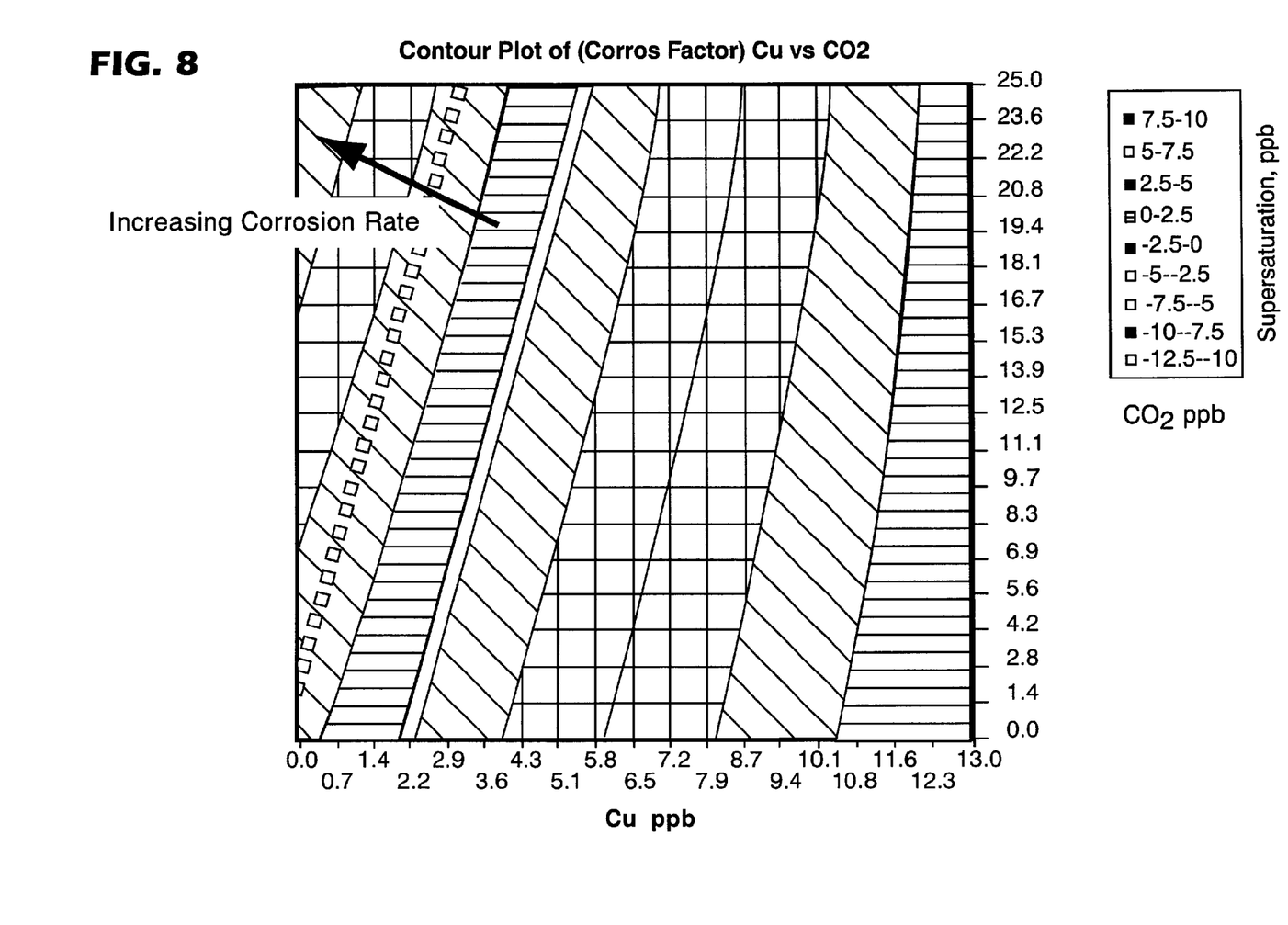
FIG. 8 is a contour graph of a corrosion factor as a function of $Cu^{++}$ and $CO_2$.

The "Corrosion Factor" was determined for a generator outlet temperature of 61.5° C. and based on the pH and the CuO solubility data of MacDonald, et al. Supersaturation at the strainer was defined as the difference between the CuO concentration at the strainer and the equilibrium solubility at the strainer for a particular temperature and pH of the coolant water. An analytical data set was fit by quadratic multiple regression analysis, producing a fit with $R^2$ adj.= 0.998 (the expression describes 99.8% of the variation), shown in FIG. 7. The Corrosion Factor at 61.5° C. is represented as a contour plot in FIG. 8.

Since temperature and all other water conditions are the same at the strainer and the inlet of the generator, the rate of winding and strand corrosion at the generator inlet at 42° C. should be the same as the rate of corrosion at the strainer. The Corrosion Factor at 42° C. is the inverse of the supersaturation at that temperature. Thus, FIG. 6 defines both supersaturation and the inverse of the Corrosion Factor at the generator inlet of the SWCS.

Figure 9:
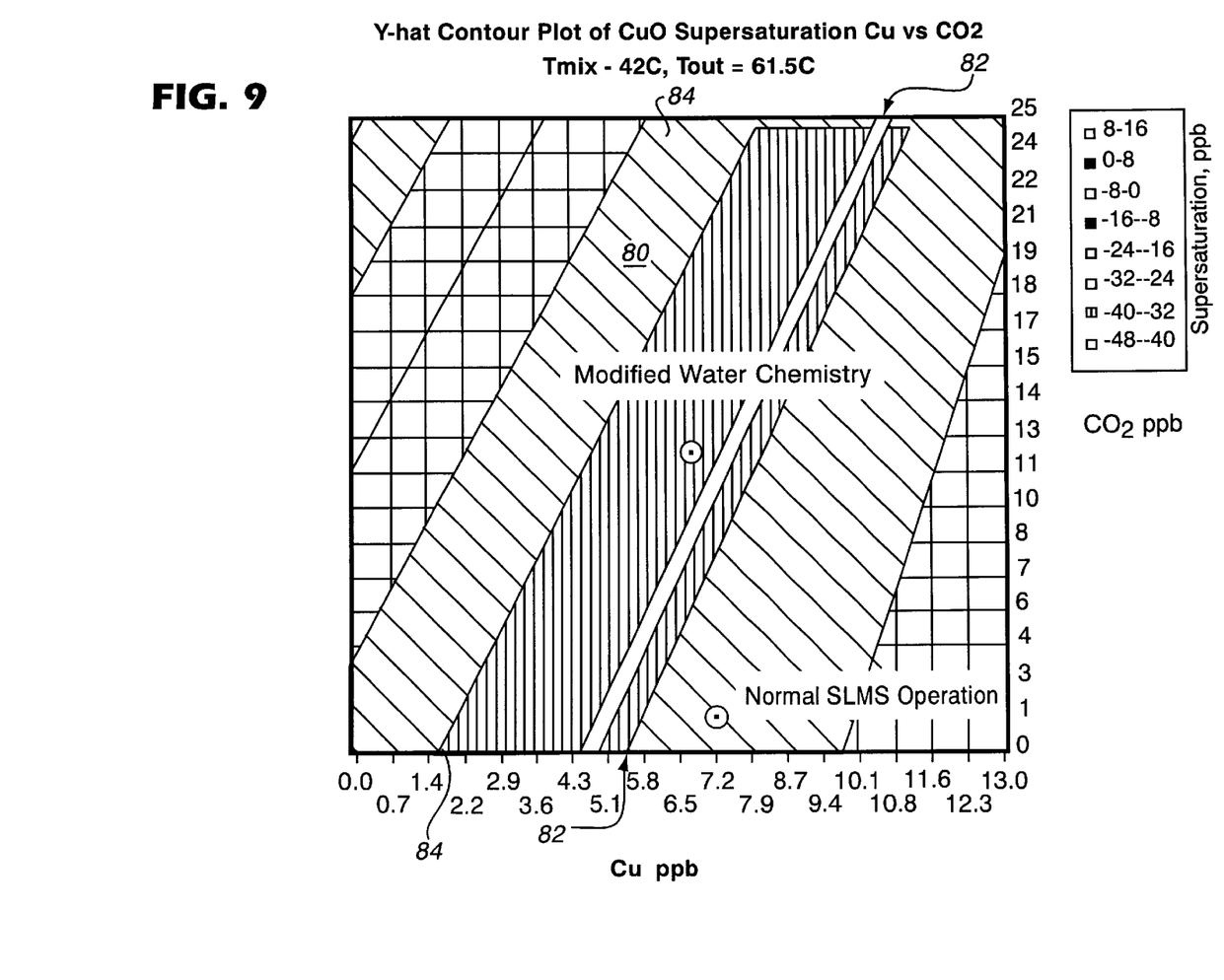
FIG. 9 is a Y-hat contour plot of CuO supersaturation as a function of $Cu^{++}$ and $CO_2$.

A range of injected $CO_2$ content for the SWCS prevents winding crystal growth at the strainer, but limits corrosion of the water-cooled generator winding strands. For an acceptable Corrosion Factor of less than 6 ppb, the region of SWCS water chemistry that prevents crystal growth at the strainer is shown as a band 80 in FIG. 9. The coolant water chemistry to the right of the line 82 in FIG. 9 from ($CO_2$=0, $Cu^{++}$=5.8) and ($CO_2$=25, $Cu^{++}$=11.5) is not recommended because greater supersaturation at the strainer would lead to strainer clogging. Coolant water chemistry to the left of the line 84 in FIG. 9 from ($CO_2$=0, $Cu^{++}$=1.8) and ($CO_2$ =25, $Cu^{++}$=8.5) is not recommended because the Corrosion Factor at the generator inlet would exceed 6 ppb. Accordingly, the band 80 defines a coolant water chemistry having an acceptable Corrosion Factor.

The $CO_2$ content of the coolant water in the SWCS is controlled by controlled injection of either pure $CO_2$ or ambient air (air contains ~0.03% $CO_2$) into the SWCS water. The injection of $CO_2$ (pure or as air) is controlled by regulating the fraction of SLMS untreated air that bypasses the $CO_2$ scrubbers that are part of the SLMS system. Since the mixed bed deionizing resin removes $CO_2$ from the SWCS water, the $CO_2$ content of the SWCS will be the mass flow of $CO_2$ injected by the SLMS system divided by the mass flow of water through the deionizing resin bed. A typical SLMS system operates with 0.5 standard cubic feet per minute (scfm) of air that has $CO_2$ removed by chemical scrubbers. If the same system injected air that had not been scrubbed, then a steady state $CO_2$ concentration of 24 ppb would develop in a system with 105 cfm water flow through the deionizer bed. To achieve the specific 12 ppb target level shown in FIG. 9, 0.25 scfm air should bypass the SLMS $CO_2$ scrubber to bubble through the reservoir water.

The $CO_2$ content in the SWCS may be determined using measured values of SWCS pH and $Cu^{++}$ concentration. Initially, the flow rate past the $CO_2$ scrubber in the SLMS unit is adjusted to maintain the water chemistry within the band of FIG. 9 as the copper content of the coolant changes. Once a stable water chemistry is achieved, the SLMS bypass air flow rate is held constant.

Figure 10:
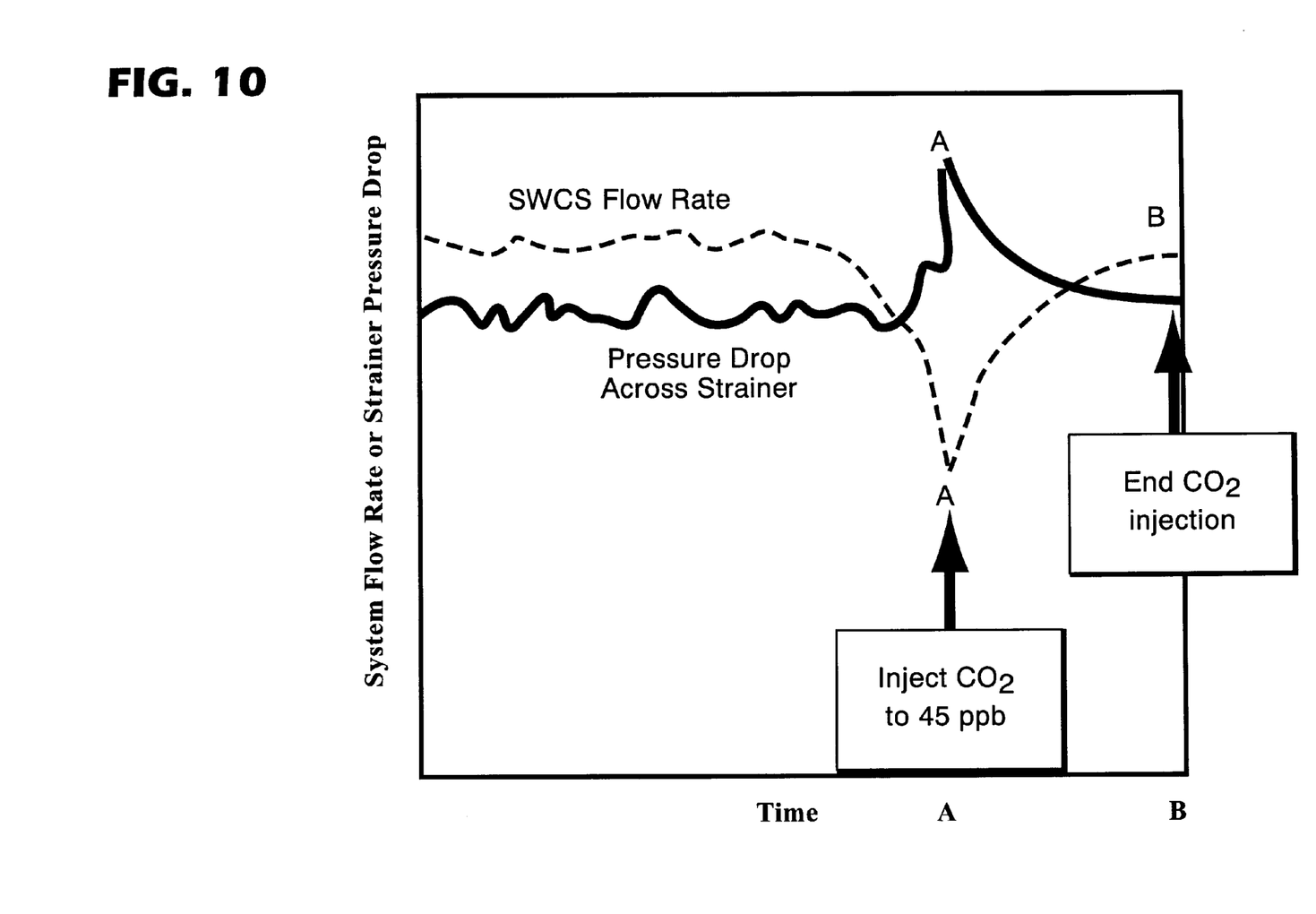
FIG. 10 is a schematic plot of strainer pressure drop and stator water cooling flow rate as a function of time.

Strainer plugging can be reversed even if the SWCS system has been operated under conditions of CuO supersaturation at the strainer and the strainer is nearly clogged. The pressure drop across the strainer is usually monitored so that the coolant flow restriction through the strainer is detectable. FIG. 10 shows a schematic plot of strainer pressure drop and SWCS flow rate versus time, just before a strainer clog would otherwise force a plant outage at time "A". The rapid increase in pressure drop across the strainer indicates that the last openings in the strainer mesh are becoming highly clogged. Once a high pressure drop through the strainer is detected, the solubility of CuO at the strainer is readily increased to create a large Corrosion/Factor at the strainer by a large increase in $CO_2$ content in the SWCS water.

Figure 11:
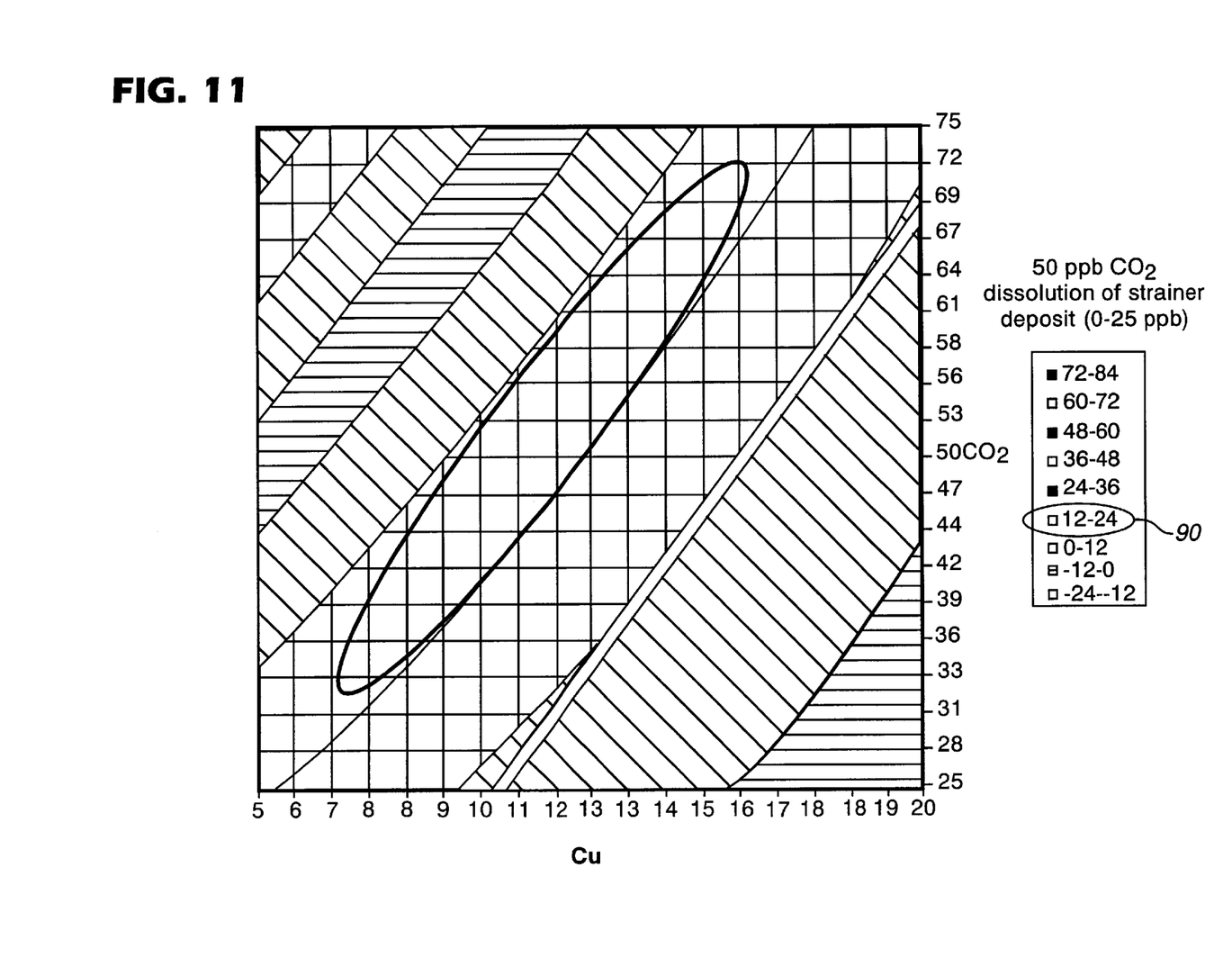
FIG. 11 is a Y-hat contour plot showing an analytical determination of a corrosion factor as a function of $Cu^{++}$ and $CO_2$.

An increase of $CO_2$ well above the recommended 3 to 20 ppb range should produce a high Corrosion/Factor. An analytical contour plot of Corrosion Factor versus Cu and $CO_2$ is shown in FIG. 11. A Corrosion Factor of 12–24 ppb $Cu^{++}$90 may be an exemplary target level, although a higher Corrosion Factor, as high as 50 ppb could be sustained for a moderate period of time. Since the strainer deposit consists of fine needles of CuO crystals, a high Corrosion Factor for a short time should dissolve the deposit on the strainer without causing significant corrosion of the passivating dense CuO layer. This is accomplished by increasing the SLMS bypass air flow to 1 scfm, which leads to a steady-state concentration of 45 ppb $CO_2$ in the SWCS.

Recording the pressure drop across the strainer can be useful to monitor the progress of the strainer deposit removal. When the pressure drop across the strainer returns to normal values, the $CO_2$ injection can be stopped. This may mean that only part of the deposit has been removed because the pressure drop is only rapidly changing when the strainer is almost fully clogged. Therefore, returning the system to the normal $CO_2$ level of less than 1 ppb at time "B" (FIG. 10) may mean that the strainer is still mostly clogged. The process of $CO_2$ injection to increase the Corrosion Factor to 10–20 ppb can be repeated each instant that the pressure drop increases significantly. In this way, a forced outage is prevented until the scheduled outage of the generator. At the scheduled outage, the partially clogged strainer can be replaced.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method to dissolve cupric oxide (CuO) deposits on a strainer of a stator winding cooling system comprising the steps of:
   a. increasing a cupric oxide solubility level of coolant fluid flowing though the stator winding cooling system by injecting carbon dioxide ($CO_2$) into the coolant, and
   b. dissolving cupric oxide deposits formed on the strainer by flowing the higher solubility level coolant through the strainer.

2. A method to dissolve cupric oxide deposits as in claim 1 wherein the step of increasing the cupric oxide solubility level reduces the solubility from a supersaturated level to a level no greater than a saturated level.

3. A method to dissolve cupric oxide deposits as in claim 1 wherein the carbon dioxide is injected at a concentration of between 3 to 20 parts per billion of the coolant.

4. A method to dissolve cupric oxide deposits as in claim 1 wherein the $CO_2$ is injected by injecting untreated air into the coolant.

5. A method to dissolve cupric oxide deposits as in claim 1 further comprising the steps of:
   c. detecting a coolant pressure drop across the strainer, and
   d. initiating the step of increasing the cupric oxide solubility when the pressure drop exceeds a predetermined threshold pressure drop.

6. A method to dissolve cupric oxide deposits as in claim 1 further comprising the step of;
   c. detecting a pressure drop as the cool ant flows through the strainer, and
   d. starting the injection of carbon dioxide after the detected pressure drop increases to above a predetermined threshold level.

7. A method to dissolve cupric oxide as in claim 6 further comprising the step of ceasing the injection of carbon dioxide when the pressure drop across the strainer decreases to a second predetermined threshold pressure drop level.

8. A method to dissolve cupric oxide deposits formed on a strainer in a stator winding cooling system comprising the steps of:
   a. circulating coolant fluid having a supersaturated concentration level of cupric oxide in the stator winding cooling system;
   b. dissolving carbon dioxide into the coolant fluid to increase a solubility level of the cupric oxide in the coolant fluid until the concentration level of the cupric oxide is no greater than a saturated level, and
   c. dissolving the cupric oxide deposits by flowing the higher solubility level coolant through the strainer in the stator winding cooling system.

9. A method to dissolve cupric oxide deposits as in claim 8 further comprising the step of:
   c. detecting a pressure drop as the coolant flows through a strainer in the stator winding cooling system, and
   d. injecting carbon dioxide into the coolant after the detected pressure drop increases to above a predetermined threshold level.

10. A method to dissolve cupric oxide as in claim 9 further comprising the step of ceasing the injection of carbon dioxide when the pressure drop across the strainer decreases to a second predetermined threshold pressure drop level.

* * * * *

UNITED STATES PATENT AND TRADEMARK OFFICE
CERTIFICATE OF CORRECTION

PATENT NO.     : 6,596,175 B2                                                                 Page 1 of 1
DATED          : July 22, 2003
INVENTOR(S)    : Rowe It is certified that error appears in the above-identified patent and that said Letters Patent is hereby corrected as shown below:

<u>Column 1,</u>
Line 60, kindly delete "widings" and insert -- windings -- therefor.

<u>Column 3,</u>
Line 42, kindly delete "2A" and insert -- 3A -- therefor.

Signed and Sealed this

Eleventh Day of November, 2003

JAMES E. ROGAN
*Director of the United States Patent and Trademark Office*